United States Patent [19]

Simko, Jr.

[11] Patent Number: 4,618,517

[45] Date of Patent: Oct. 21, 1986

[54] THERMAL INSULATING MATERIAL

[76] Inventor: Frank A. Simko, Jr., 5666 Cope Leyte Dr., Sarasota, Fla. 33580

[21] Appl. No.: 850,426

[22] Filed: Apr. 8, 1986

Related U.S. Application Data

[63] Continuation of Ser. No. 767,059, Aug. 19, 1985, abandoned, which is a continuation of Ser. No. 626,016, Jun. 29, 1984, abandoned.

[51] Int. Cl.$^4$ .......................... B32B 1/08; B32B 3/26
[52] U.S. Cl. ..................................... 428/36; 428/69; 428/188; 428/920
[58] Field of Search ................... 428/36, 69, 188, 920; 126/450

[56] References Cited

U.S. PATENT DOCUMENTS 3,769,770 11/1973 Deschamps et al. ................. 428/69
4,303,061 12/1981 Torobin ............................... 126/450
4,303,729 12/1981 Torobin ............................... 126/450
4,513,041 4/1985 Delluc .................................. 428/69

FOREIGN PATENT DOCUMENTS 2629171 1/1978 Fed. Rep. of Germany ........ 428/69

*Primary Examiner*—Paul J. Thibodeau
*Attorney, Agent, or Firm*—Arnold Grant

[57] ABSTRACT

The present invention is a thermal insulating material comprising layers of thin walled hollow glass or plastic tubes stacked together so that their longitudinal axes are perpendicular to the direction of heat flow. The tubes are preferably eliptical in cross-section with the larger axes of the elipse also being aligned in a plane perpendicular to the direction of heat flow. The tubes may be sealed at each end or open; if sealed they may contain air or a low conductivity gas at atmospheric pressure or less than atmospheric pressure. In preferred embodiments the internal surface of the tubes are coated with a reflective material.

12 Claims, 2 Drawing Figures

THERMAL INSULATING MATERIAL

This is a continuation of application Ser. No. 767,059, filed Aug. 19, 1985, now abandoned, which is a continuation of Ser. No. 626,016 filed June 29, 1984, now abandoned.

BACKGROUND OF THE INVENTION

The present invention relates to thermal insulating material for use in construction of homes, factories and office buildings. More particularly, the present invention relates to a thermal barrier comprising layers of thin walled hollow tubes stacked together so that their longitudinal axes are aligned in a plane perpendicular to the direction of heat flow.

Efficient utilization of thermal insulation continues to be one of the best methods of conserving energy and controlling heating and cooling costs. At the same time, the health and safety concerns associated with conventional insulating materials, such as mineral fibers and plastic foams, has raised serious questions about their long term applicability. E.g., recent discoveries point to the possibility that fiberglass of certain particle sizes may be carcinogenic in the same or similar manner as asbestos. In addition, the performance of mineral fibers is relatively limited, with typical R-values being about 2.5 per inch. The use of plastic foams, such as polyurethane, urea-formaldehyde and polystyrene, has also been criticized because of their dimensional instability and tendency to evolve their blowing gases and/or unreacted constituents, which significantly lowers their performance. Moreover, they are flammable and many generate poisonous or noxious gases as they burn.

Efforts are underway to improve this situation by developing new kinds of materials. One of these newly developed insulation materials utilizes packed glass microspheres coated with a reflective material and having a vacuum in the intersticial area between microspheres. The outer reflective coating is intended to minimize heat transfer by radiation; the vacuum in the intersticial area reduces heat transfer by gas conduction. Although insulation materials made from these types of microspheres possess distinct advantages over commercially available materials, they also have several inherent disadvantages. For example, it has been found difficult, if not impossible, in many applications to maintain the vacuum in the intersticial area. This dramatically increases energy losses induced by gas conduction. It has also been found to be very difficult to deposit a relatively thin film of reflective material on the outer surface of the microspheres. Even where this has been accomplished, the coating wears at the area of point to point contact between microspheres. The point to point contact, in and of itself, increases heat transfer by solid conduction and the wearing of the reflective material necessarily increases heat transfer by radiation. Moreover, the known methods of producing hollow glass microspheres, e.g., U.S. Pat. Nos. 2,797,201 and 3,365,315, etc. have not been successful in producing products of relatively uniform size or uniform thin walls. This makes it difficult to produce insulation materials of controlled and predictable characteristics and quality.

Another packed glass microsphere insulating material is taught in U.S. Pat. No. 4,303,061. In that invention, thin walled hollow microspheres contain a vacuum and a reflective coating on the interior surface. The microsphere is formed from molten glass and the vacuum and reflective coating are put in place at the time the microsphere is made. According to the patent, all of these operations are conducted at the melting temperature of glass, about 2,000° F., an extremely high and difficult environment in which to carry out such procedures. To further compound this difficulty, glass evolves water at these temperatures. The water, in turn, can be reduced by the metals comprising the reflective coating to form hydrogen. Since hydrogen is an excellent conductor of heat this result can have a deleterious effect on the insulation property of the microspheres. Equally as important, at these temperatures it is extremely difficult to evenly deposit a reflective coating of the desired thickness on the interior surface of the microsphere.

A need thus exists in the art for a thermal barrier which is not subject to the deficiencies of either the present commercially available materials or the packed glass microsphere technology, which can be readily manufactured with predictable characteristics and quality, and which can be mass produced at prices attractive to the construction industry.

SUMMARY OF THE PRESENT INVENTION

The present invention solves each of the foregoing problems by providing an insulation material comprising at least two layers of hollow, thin walled tubes positioned such that their longitudinal axes are aligned in a plane perpendicular to the direction of heat flow. The array of tubes may be constructed of glass or plastic and are preferably joined together into a unitary structure.

In a first alternative of the present invention, each of the tubes has an eliptical or flattened cross-section, with the larger cross-sectional dimension, referred to hereinafter for simplicity as the width, being aligned in a plane perpendicular to the direction of heat flow. The effect on R-value (the measure of the ability of the system to retain absorbed energy) is directly related to the degree that the tubes are flattened. Improvements have been noted in width to height (i.e., greater to lesser dimension) ratios for the tubes in excess of 1 and as high as width to height ratios of 6 or more.

In another embodiment, the ends of the tubes are sealed and the interiors at least partially evacuated. This reduces convection caused heat transfer within the insulation material, i.e., fluid flow in the interior spaces of the tubes. In an alternative to this embodiment the ends of the tubes are also sealed and a low conductivity gas is introduced into the interiors. The low conductivity gas may be at atmospheric or reduced pressure. This also controls heat transfer by convection. Examples of suitable low conductivity gases include xenon, krypton, iodine, bromine, chlorine, hydrogen bromide, carbon disulfide, and halocarbons, including Freon types $R_{11}$, $R_{12}$, $R_{21}$ and $R_{22}$. All of these materials have thermal conductivities significantly lower than air. They are selected on the basis of their performance, cost and toxicity. Particularly preferred are xenon, krypton, iodine and the halocarbons.

In still another embodiment, the interior surface of the tubes are coated with a thin layer of reflective material such as aluminum, zinc, nickel, silver, gold, chromium, or copper. The coating reflects energy in the infrared spectrum and thus controls radiation generated heat transfer through the insulation material.

DRAWING

These and other features, aspects and advantages of the present invention will become more apparent upon consideration of the following description, appended claims and accompanying drawings wherein:

FIG. 1 is a horizontal cross-section of the part of a wall unit containing the thermal insulating material according to the present invention; and, FIG. 2 is a vertical cross-section of a part of the wall unit taken along the line 2—2 of FIG. 1.

DETAILED DESCRIPTION OF THE INVENTION

Figure 1:
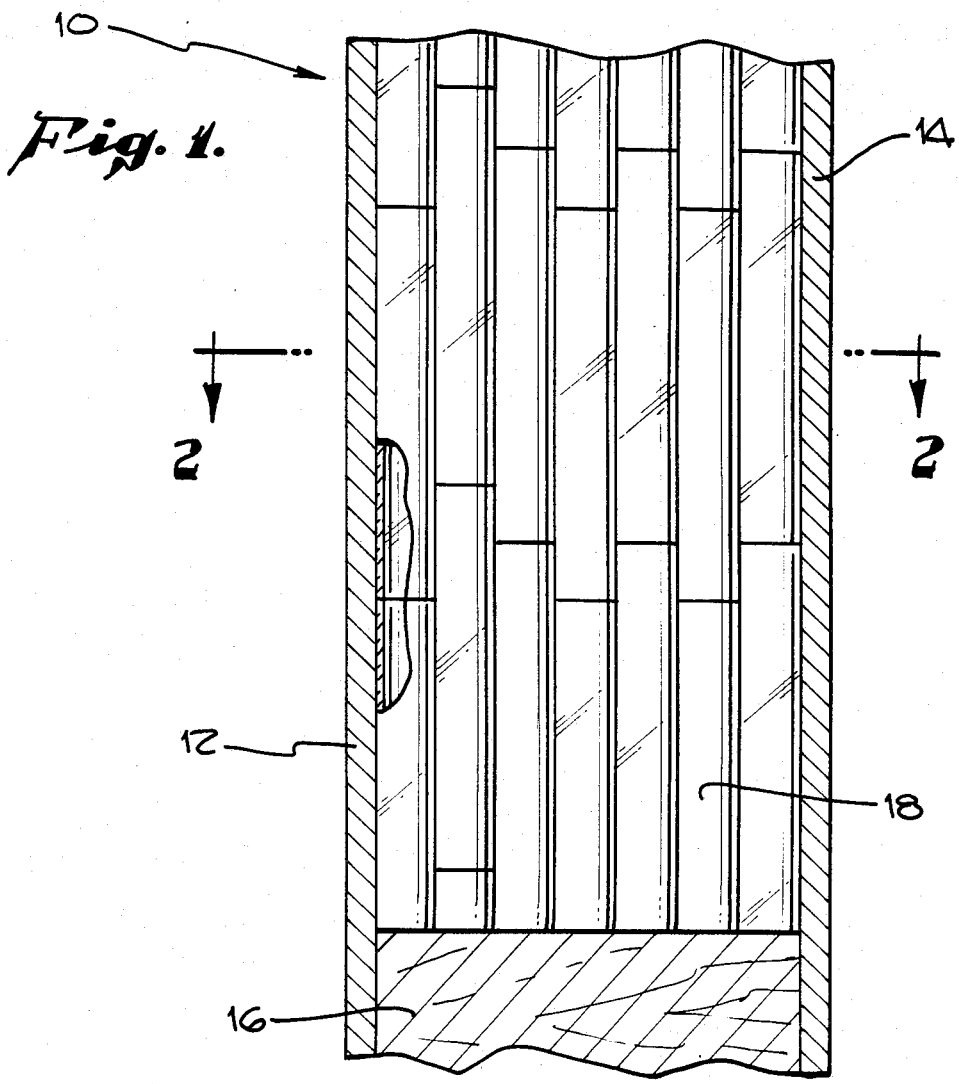
Figure 2:
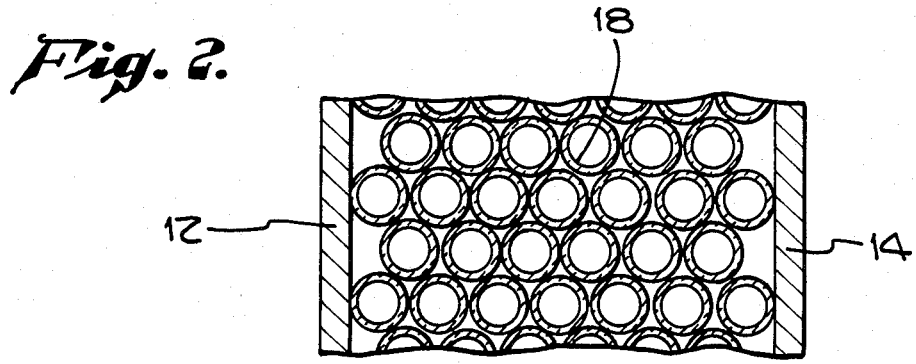

Referring now to FIGS. 1 and 2, the present invention 10 is shown in its environment of use, between the inner wall 12, outer wall 14 and stud 16 of a structure. The present invention is a heat barrier comprising layers of thin walled tubes 18 joined together and aligned in a plane perpendicular to the direction of heat flow, which is from one wall to the other of the structure.

The individual tubes are constructed of either glass or plastic having a diameter of from about ⅛-inch to about 1-inch, preferably ¼-inch to ¾-inch and a length of from about 1-inch to 6-inches or more. Shorter, as opposed to longer, tubes are preferred to minimize the deleterious effect of a tube being punctured by a nail or otherwise damaged during use. I.e., the insulating effect of an entire closed-ended tube can be lost if the tube is punctured. Similarly the insulating effect of an open-ended tube can be lost if the puncture shatters the tube. Thus, a nail damaging a shorter tube has less of a negative effect on the overall integrity of the system than a nail puncturing a longer tube. The length to diameter ratio for the tube should be at least 1.5, preferably from about 2 to about 10 and most preferably from about 2 to about 8.

The wall thickness for the tubes 18 should also be as thin as practicable to minimize heat transfer by conduction. Preferred thicknesses are from about 0.005 inches to about 0.02 inches, with the practical limiting factors being structural integrity and the ability of the tubes to withstand the rigors of being formed into multilayered units and instalation in a structure. Heat transfer by conduction and convection are also effected by the ratio of the diameter to the wall thickness of the tubes. It is preferred that this ratio be at least 50 and most preferred that it be from about 50 to about 150.

Glasses and plastics best suited for the present invention have a thermal conductivity expressed in [BTU-×inches] divided by [hour×feet²×degrees F.] of 5 or less. They must also be able to maintain their structural integrity and be otherwise unaffected by temperatures of up to about 300° F. Suitable glasses include soda lime silica glasses and borosilicate glasses. Suitable plastics include polystyrene, chlorinated polyvinylchloride, polypropylene, polybutylene terephthalate, ABS, polysulfone, fluorinated plastics such as teflon, polycarbonates and nylon.

In a preferred embodiment the tubes are flattened, i.e., eliptical in cross-section, with the larger cross-section dimension referred to herein as the width, being aligned in a plane perpendicular to the direction of heat flow through the structure. As used herein, references to diameters and dimensions for diameters for eliptical cross-sectioned tubes means the direction perpendicular to heat flow, i.e., the width of such tubes. An increase in R-value (the measure of the ability of the system to retain absorbed energy) is noted with even minor increases in the ratio of the tube width to height or flattening ratio. Preferred flattening ratios are from about greater than 1 to about 6 and most preferred are from about greater than 1 to about 4.

In another preferred embodiment the ends of the tubes are sealed and either partially or fully evacuated. This reduces heat transfer through the tube and thus through the insulation material by convection. A similar result is obtained when the tube is filled with a low conductivity gas such as xenon, krypton, iodine, bromine, chlorine, hydrogen bromide, carbon disulfide, or a halocarbon. Combinations of gases may also be used and the pressure in the tubes can be at atmospheric or below. All of these materials have thermal conductivities significantly lower than air. Selection of the particular gas or combination of gases to be used will be determined on the basis of performance, cost and toxicity. The most preferred low conductivity gases are xenon, krypton, iodine and the halocarbons.

In a still further embodiment, the interior surfaces of the tubes 18 are coated with a thin layer of a material which will reflect infrared energy. Examples of suitable materials include aluminum, zinc, nickel, silver, gold, chromium or copper. By thin layer is meant angstrom range to prevent the reflective material from measurably adding to heat transfer by conduction. The reflective coating reduces heat transfer in the tubes and thus in the insulating material by radiation. The reflective coating can be applied to the tubes by the well known techniques of dipping, sputtering or vacuum metalizing.

The tubes 18 are joined together, end-to-end, into rows and several rows are placed side-by-side to form a layer of tubes. The rows may be staggered so that the end of one tube does not reside in the same plane as the end of the tube in the adjacent row. Each layer may extend from about 4 feet to 6 or more feet in each direction. Layers of tubes are then stacked, one on top of the other to form the novel insulation material of the present invention. From about 2 to about 10 or more layers may be used, but typically from about 2 to about 5 layers will achieve a commercially desirable insulation effect. The tubes in each row and each layer and the individual layers may be sintered or glued together to then form unitary structure. The layers of tubes may be stacked in a rectangular configuration with the center lines of the tubes in each layer being aligned with the center lines of the tubes in the layers immediately above and below. Alternatively, the tubes may be stacked in a hexagonal configuration with the tubes in one layer being off-set from the tubes in the layers immediately above and below. Any other suitable configuration may also be used.

The following table shows the effect of the various embodiments of the present invention on thermal insulation performance as expressed in R-value. For purposes of comparison, fiberglass has an R-value of about 2.5 per inch.

| Wall Thickness Inches (a) | Initial Diameter (d) Inches | Length (L) Inches | d/a[(1)] | L/D[(1)] | Flattening Ratio X/Y | Conductivity | R/Inch[(2)] |
|---|---|---|---|---|---|---|---|
| 0.008 | — | — | 45 | 2 | 0 | 5 | 3 |
| 0.008 | — | — | 90 | 2 | 0 | 5 | 6 |

SUMMARY - INSULATION EFFECTIVENESS OF CAPSULES

| Wall Thickness Inches (a) | Initial Diameter (d) Inches | Length (L) Inches | $d/a^{(1)}$ | $L/D^{(1)}$ | Flattening Ratio X/Y | Conductivity | $R/Inch^{(2)}$ |
|---|---|---|---|---|---|---|---|
| 0.008 | — | — | 180 | 2 | 0 | 5 | 12 |
| 0.008 | 1.50 | 3.00 | 180 | 2 | 0 | 5 | 12 |
| 0.008 | 0.75 | 1.50 | 90 | 2 | 0 | 5 | 6 |
| 0.005 | 0.90 | 1.80 | 180 | 2 | 0 | 5 | 12 |
| 0.005 | 0.50 | 1.00 | 90 | 2 | 0 | 5 | 6 |
| 0.005 | 0.50 | 4.00 | 100 | 8 | 0 | 5 | 10 |
| 0.005 | 0.50 | 4.00 | 200 | 8 | 2 | 5 | 20 |
| 0.005 | 0.50 | 4.00 | 400 | 8 | 4 | 5 | 40 |
| 0.008 | 0.50 | 4.00 | 125 | 4 | 2 | 5 | 10 |
| 0.005 | 0.50 | 4.00 | 200 | 4 | 2 | 5 | 16 |
| 0.008 | 0.50 | 4.00 | 125 | 4 | 2 | 4 | 12.5 |
| 0.005 | 0.50 | 4.00 | 200 | 4 | 2 | 4 | 20.0 |
| 0.008 | 0.50 | 8.00 | 125 | 8 | 2 | 4 | 13.9 |
| 0.005 | 0.50 | 8.00 | 200 | 8 | 2 | 4 | 22.2 |
| 0.008 | 0.50 | 8.00 | 125 | 8 | 2 | 5 | 11.1 |
| 0.005 | 0.50 | 8.00 | 200 | 8 | 2 | 5 | 17.8 |
| $0.015^{(5)}$ | 0.50 | 1.00 | 30 | 2 | 0 | 1.74 | 5.70 |
| $0.015^{(6)}$ | 0.50 | 1.00 | 30 | 2 | 0 | 0.73 | 13.70 |
| 0.005 | 0.50 | 1.00 | 90 | 2 | 0 | 5 | $1.40^{(3)}$ |
| 0.005 | 0.50 | 1.00 | 90 | 2 | 0 | 5 | $1.15^{(4)}$ |

$^{(1)}$a = wall thickness, x = tube width, y = tube height
$^{(2)}$All tubes are made of glass, have a reflecting coating and Xenon in the interior, unless otherwise noted
$^{(3)}$Not coated
$^{(4)}$Contains air in the interior
$^{(5)}$Tubes made from Teflon
$^{(6)}$Tubes made from polystyrene As this invention may be embodied in several forms without departing from the spirit or essential character thereof, the present embodiments are illustrative and not restrictive. The scope of the invention is defined by the appended claims rather than by the description preceding them, and all embodiments which fall within the meaning and range of equivalency of the claims are, therefore, intended to be embraced by those claims.

I claim:

1. A thermal insulating material comprising at least two layers of thin-walled, hollow tubes arranged such that the longitudinal axes of the tubes are perpendicular to the direction of heat flow, each layer having at least two rows of such tubes, and each tube having a length-to-diameter ratio of at least about 1.5 to about 10 and a diameter-to-wall thickness ratio of at least about 50 to 150.

2. A thermal insulating material as defined in claim 1 wherein the internal surface of the tubes are coated with a reflective material.

3. A thermal insulating material as defined in claim 2 wherein the reflective material is selected from the group consisting of aluminum, zinc, nickel, silver, gold, chromium and copper.

4. A thermal insulating material as defined in claim 2 wherein the tubes have an eliptical cross-section and a flattening ratio of from about greater than 1 to about 6.

5. A thermal insulating material as defined in claim 2 wherein the tubes are sealed at each end and at least partially evacuated.

6. A thermal insulating material as defined in claim 2 wherein the tubes are sealed at each end and the interiors contain a low conductivity gas selected from the group consisting of xenon, krypton, iodine, bromine, chlorine, hydrogen bromide, carbon disulfide and halocarbons.

7. A thermal insulating material as defined in claim 2 wherein the tubes are constructed of a material selected from the group consisting of glasses and plastic having a thermal conductivity of less than about 5.

8. A thermal insulating material as defined in claim 1 wherein at least some of the tubes have a surface coated with a material which reflects infrared energy.

9. A thermal insulating material as defined in claim 1 wherein at least some of the tubes have their internal surfaces coated with a reflective material.

10. A thermal insulating material comprising at least two layers of thin-walled, hollow tubes arranged such that the longitudinal axis of the tubes are perpendicular to the direction of heat flow, each layer having at least two rows of such tubes, each tube being constructed of a material selected from the group consisting of glasses and plastics having a thermal conductivity of less than about 5, and each tube having a length-to-diameter ratio of at least about 1.5 and a diameter-to-wall thickness ratio of at least about 50.

11. A thermal insulating material as defined in claim 10 wherein the internal surface of at least some of the tubes are coated with a material selected from the group consisting of aluminum, zinc, nickel, silver, gold, chromium and copper.

12. A thermal insulating material as defined in claim 11 wherein at least some of the tubes have an eliptical cross-section and a flattening ratio of greater than about 1.

* * * * *